(12) United States Patent
Choi et al.

(10) Patent No.: US 11,310,772 B2
(45) Date of Patent: Apr. 19, 2022

(54) METHOD AND APPARATUS FOR CONFIGURING BANDWIDTH PART IN SIDELINK COMMUNICATION

(71) Applicants: Hyundai Motor Company, Seoul (KR); Kia Motors Corporation, Seoul (KR)

(72) Inventors: Su Han Choi, Gyeonggi-do (KR); Gene Beck Hahn, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 104 days.

(21) Appl. No.: 16/808,986

(22) Filed: Mar. 4, 2020

(65) Prior Publication Data

US 2020/0288434 A1 Sep. 10, 2020

Related U.S. Application Data

(60) Provisional application No. 62/814,559, filed on Mar. 6, 2019.

(30) Foreign Application Priority Data

Feb. 18, 2020 (KR) .................. 10-2020-0019810

(51) Int. Cl.
*H04W 72/02* (2009.01)
*H04W 72/04* (2009.01)
*H04W 92/18* (2009.01)

(52) U.S. Cl.
CPC ....... *H04W 72/02* (2013.01); *H04W 72/0453* (2013.01); *H04W 92/18* (2013.01)

(58) Field of Classification Search
CPC . H04W 72/02; H04W 72/0453; H04W 92/18; H04W 72/042; H04W 72/0446; H04W 72/121; H04L 5/0044; H04L 5/0007; H04L 5/0091
See application file for complete search history.

(56) References Cited

U.S. PATENT DOCUMENTS

2020/0053524 A1* 2/2020 Novlan .................. H04W 4/40
2020/0092833 A1* 3/2020 Agiwal ............... H04W 72/042

* cited by examiner

*Primary Examiner* — Thai Nguyen
(74) *Attorney, Agent, or Firm* — Mintz Levin Cohn Ferris Glovsky and Popeo, P.C.; Peter F. Corless

(57) ABSTRACT

An operation method of a first terminal in a communication system is provided. The method includes configuring a plurality of sidelink (SL) bandwidth parts (BWPs) used for SL communication between the first terminal and a second terminal and transmitting an SL BWP list including one or more SL BWPs among the plurality of SL BWPs to the second terminal via a default SL BWP. The SL communication is then performed with the second terminal using an initial SL BWP among the one or more SL BWPs included in the SL BWP list.

20 Claims, 8 Drawing Sheets

METHOD AND APPARATUS FOR CONFIGURING BANDWIDTH PART IN SIDELINK COMMUNICATION

This application claims the benefit of priority to U.S. Provisional Patent Application No. 62/814,559 filed on Mar. 6, 2019 and Korean Patent Application No. 10-2020-0019810 filed on Feb. 18, 2020 in the Korean Intellectual Property Office (KIPO), the entire contents of which are incorporated herein by reference.

BACKGROUND

1. Technical Field

The present disclosure relates generally to sidelink communication techniques, and more specifically, to techniques for configuring a bandwidth part (BWP) for sidelink communication.

2. Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system is capable of supporting Enhanced Mobile Broadband (eMBB) communications, Ultra-Reliable and Low-Latency communications (URLLC), massive Machine Type Communications (mMTC), and the like.

The 4G communication system and 5G communication system are capable of supporting Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels.

Meanwhile, one or more bandwidth parts (BWPs) may be configured within a system bandwidth in the NR communication system, and communications between a base station and a terminal may be performed within a BWP (e.g., an active BWP). The BWP may be classified into a downlink (DL) BWP for DL communications and an uplink (UL) BWP for UL communications. The maximum number of DL BWPs and UL BWPs configurable within the system bandwidth may be four, respectively. One BWP may include consecutive resource block(s) (RB(s)) in the frequency domain, and one subcarrier spacing may be used in one BWP. Only one BWP (e.g., DL BWP, UL BWP) may be activated in a specific time period. However, BWPs are not used in the sidelink communication, and methods for configuring the BWP for sidelink communication are required.

SUMMARY

Accordingly, the present disclosure provides a method and an apparatus for configuring a BWP for sidelink communication. An operation method of a first terminal in a communication system may include configuring a plurality of sidelink (SL) bandwidth parts (BWPs) used for SL communication between the first terminal and a second terminal; transmitting an SL BWP list including one or more SL BWPs among the plurality of SL BWPs to the second terminal through a default SL BWP; and performing the SL communication with the second terminal using an initial SL BWP among the one or more SL BWPs included in the SL BWP list.

The configuration information of the plurality of SL BWPs may be exchanged between the first terminal and the second terminal through the default SL BWP, and the configuration information may include one or more of information regarding a location, a size, and a valid time interval of each of the plurality of SL BWPs.

The one or more SL BWPs included in the SL BWP list may be selected from a plurality of SL BWPs configured by the first terminal and a plurality of SL BWPs configured by the second terminal. The default SL BWP may be configured by a base station through a combination of one or more of radio resource control (RRC) signaling, medium access control (MAC) layer signaling, and physical (PHY) layer signaling.

The initial SL BWP may be determined by the first terminal, and configuration information of the initial SL BWP may be transmitted to the second terminal together with the SL BWP list. The plurality of SL BWPs may belong to candidate SL BWPs configured by a base station. The SL communication may be performed within a valid time interval in which the initial SL BWP is valid.

The operation method may further include when characteristics of the SL communication between the first terminal and the second terminal satisfy one or more conditions, determining that switching of the initial SL BWP is necessary; selecting a new SL BWP in the SL BWP list; transmitting a switching request message including configuration information of the new SL BWP to the second terminal; and performing the SL communication with the second terminal using the new SL BWP.

The one or more conditions may include when a valid time interval of the initial SL BWP expires, when a use of a transmission scheme different from a transmission scheme supported by the initial SL BWP is required, when a quality of the SL communication in the initial SL BWP is less than or equal to a preconfigured threshold, when a use of a SL BWP having a bandwidth different from a bandwidth of the initial SL BWP is required, and when a zone to which at least one of the first terminal and the second terminal belongs is different from a zone associated with the initial SL BWP. When the SL communication is completed in the new SL BWP, the new SL BWP may be switched to the default SL BWP or the initial SL BWP.

Furthermore, in accordance with exemplary embodiments of the present disclosure, an operation method of a second terminal in a communication system may include receiving, from a first terminal, configuration information of a plurality of sidelink (SL) bandwidth parts (BWPs) configured by the first terminal through a default SL BWP; configuring a candidate SL BWP list including one or more SL BWPs based on a plurality of SL BWPs configured by the second terminal and the plurality of SL BWPs configured by the first terminal; transmitting the candidate SL BWP list to the first terminal through the default SL BWP; receiving a final SL BWP list determined based on the candidate SL BWP list and configuration information of an initial SL BWP from the first terminal through the default SL BWP; and performing SL communication with the first terminal using the initial SL BWP.

The configuration information of the plurality of SL BWPs may include one or more of information regarding a location, a size, and a valid time interval of each of the plurality of SL BWPs. The default SL BWP may be configured by a base station through a combination of one or more of radio resource control (RRC) signaling, medium access control (MAC) layer signaling, and physical (PHY) layer signaling.

The operation method may further include when characteristics of the SL communication between the first terminal and the second terminal satisfy one or more conditions, determining that switching of the initial SL BWP is necessary; selecting a new SL BWP in the SL BWP list; transmitting a switching request message including configuration information of the new SL BWP to the first terminal; and performing the SL communication with the first terminal using the new SL BWP. When the SL communication is completed in the new SL BWP, the new SL BWP may be switched to the default SL BWP or the initial SL BWP.

Furthermore, in accordance with exemplary embodiments of the present disclosure, a first terminal in a communication system may include a processor and a memory configured to store at least one instruction executable by the processor. Additionally, the processor may be configured to arrange a plurality of sidelink (SL) bandwidth parts (BWPs) used for SL communication between the first terminal and a second terminal; receive an SL BWP list including at least one SL BWP configured by the second terminal from the second terminal through a default SL BWP; transmit a final SL BWP list including one or more SL BWPs among the plurality of SL BWPs and the at least one SL BWP included in the candidate SL BWP list to the second terminal through the default SL BWP; and perform the SL communication with the second terminal using an initial SL BWP among the one or more SL BWPs included in the final SL BWP list.

The configuration information of the plurality of SL BWPs may be exchanged between the first terminal and the second terminal through the default SL BWP, and the configuration information may include one or more of information regarding a location, a size, and a valid time interval of each of the plurality of SL BWPs. The initial SL BWP may be determined by the first terminal, and configuration information of the initial SL BWP may be transmitted to the second terminal together with the final SL BWP list.

The processor may be configured to receive a switching request message from the second terminal, the switching request message including configuration information of a new SL BWP selected in the final SL BWP list; transmit a switching response message to the second terminal, the switching response message indicating completion of configuration of the new SL BWP; and perform the SL communication with the second terminal using the new SL BWP. When the SL communication is completed in the new SL BWP, the new SL BWP may be switched to the default SL BWP or the initial SL BWP.

According to the exemplary embodiments of the present disclosure, an SL BWP for SL communications between terminals may be configured. The terminals may be configured to perform SL communications in the SL BWP. The SL communication may be performed in a unicast scheme within the SL BWP. In particular, interferences caused by the SL communication may be reduced. In addition, a time required for performing a beam measurement operation, a beam update operation, a beam recovery operation, and the like may be reduced.

A plurality of SL BWPs may be configured within the system bandwidth, and the SL BWP may be switched as needed. For example, when there is a substantial amount of SL traffic, a current SL BWP may be switched to a SL BWP having a wide bandwidth, and the SL traffic may be processed within the active SL BWP (i.e., SL BWP having a wide bandwidth). When there is a reduced amount of SL traffic, the current SL BWP may be switched to an SL BWP having a narrow bandwidth, and the SL traffic may be processed within the active SL BWP (i.e., SL BWP having a narrow bandwidth). In other words, SL resources may be used efficiently. Thus, the performance of the communication system may be improved.

BRIEF DESCRIPTION OF DRAWINGS

Embodiments of the present disclosure will become more apparent by describing in detail embodiments of the present disclosure with reference to the accompanying drawings, in which.

Figure 1:
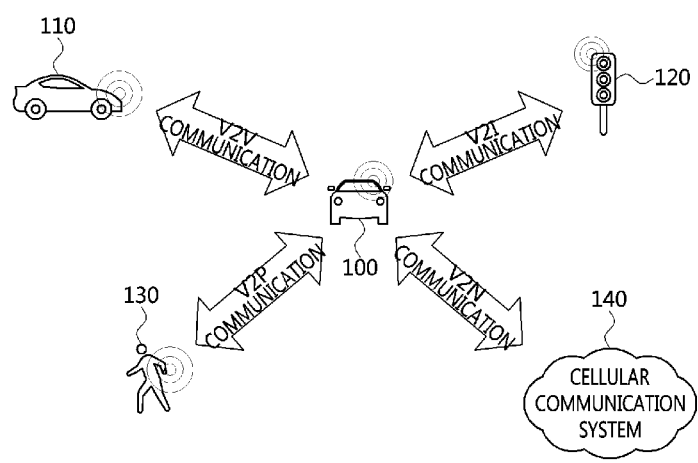
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or controller may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located within the vehicle 100) and an infrastructure (e.g., road side unit (RSU)) 120 located along a road. The infrastructure 120 may also include a traffic light or a street light which is located along the road. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that provides an indication regarding a danger by detecting a dangerous situation based on the obtained driving information and movement information. The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located within the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
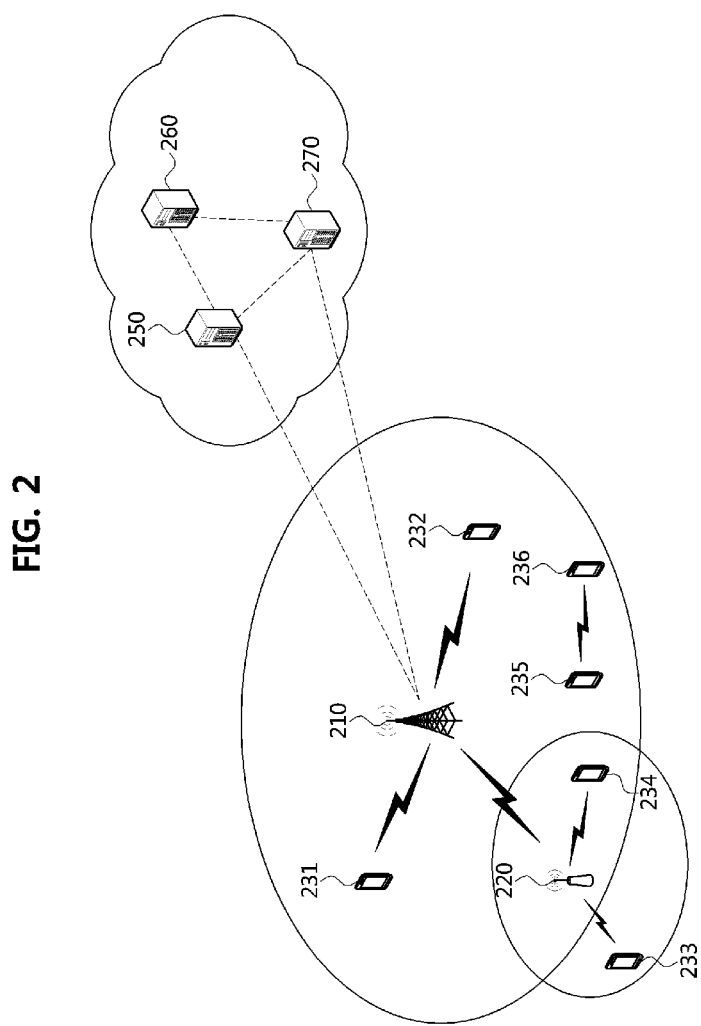
FIG. 2 is a conceptual diagram illustrating exemplary embodiments of a cellular communication system.

FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

When the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported via the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) including the cellular communication system may be configured as follows.

Figure 3:
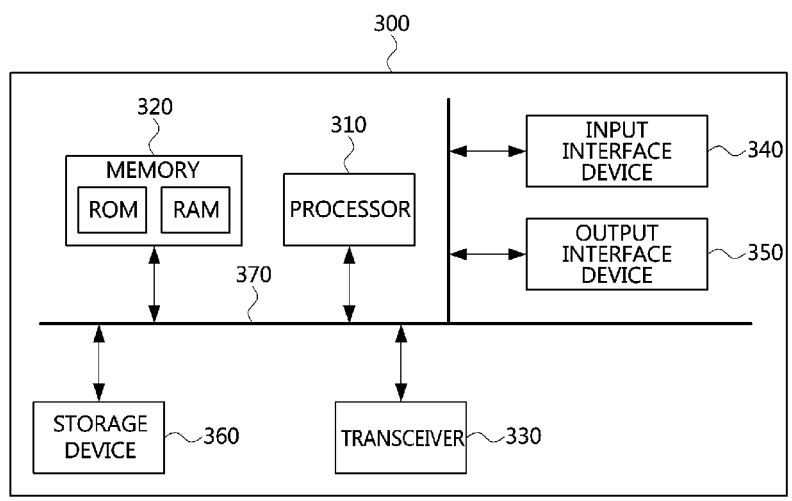
FIG. 3 is a conceptual diagram illustrating exemplary embodiments of a communication node constituting a cellular communication system.

FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations corresponding to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
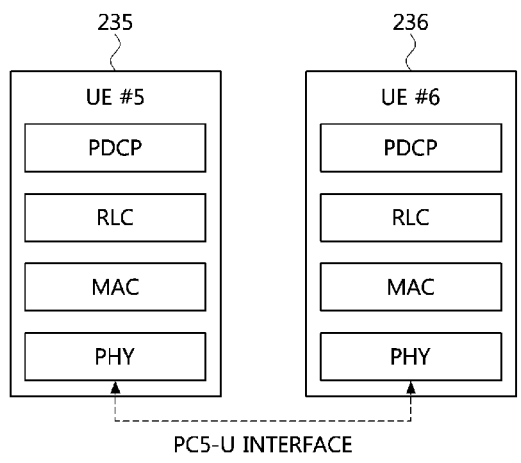
FIG. 4 is a block diagram illustrating exemplary embodiments of a user plane protocol stack of an UE performing sidelink communication.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
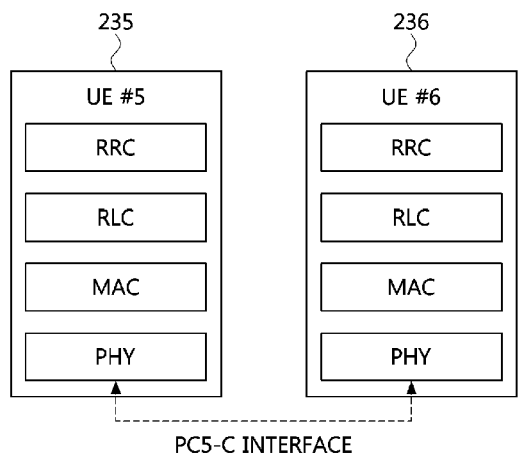
FIG. 5 is a block diagram illustrating a first exemplary embodiment of a control plane protocol stack of an UE performing sidelink communication.
Figure 6:
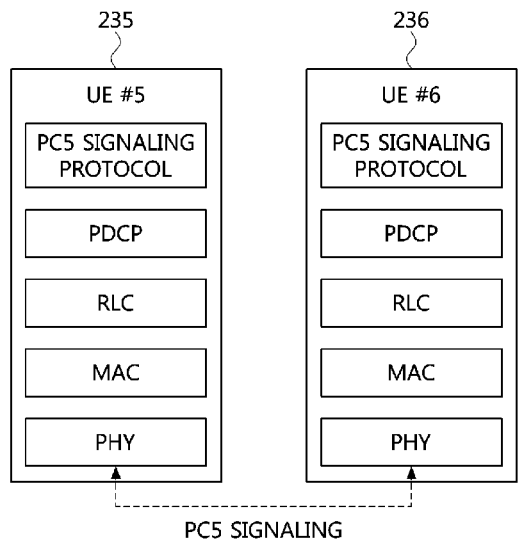
FIG. 6 is a block diagram illustrating a second exemplary embodiment of a control plane protocol stack of an UE performing sidelink communication.

FIG. 5 is a block diagram illustrating a first exemplary embodiment of a control plane protocol stack of an UE performing sidelink communication, and FIG. 6 is a block diagram illustrating a second exemplary embodiment of a control plane protocol stack of an UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. The sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. In particular, the sidelink data may be transmitted and received via resources selected autonomously by the UE (e.g., UE 235 or 236) within the resource pool configured by the dedicated RRC signaling procedure or the broadcast RRC signaling procedure.

Hereinafter, methods for configuring a bandwidth part (BWP) and switching BWPs will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a first vehicle is described, a corresponding second vehicle may be configured to perform an operation that corresponds to the operation of the first vehicle. Conversely, when an operation of the second vehicle is described, the corresponding first vehicle may be configured to perform an operation that corresponds to the operation of the second vehicle. In the exemplary embodiments described below, the operation of the vehicle may be the operation of the communication node located in the vehicle.

Figure 7:
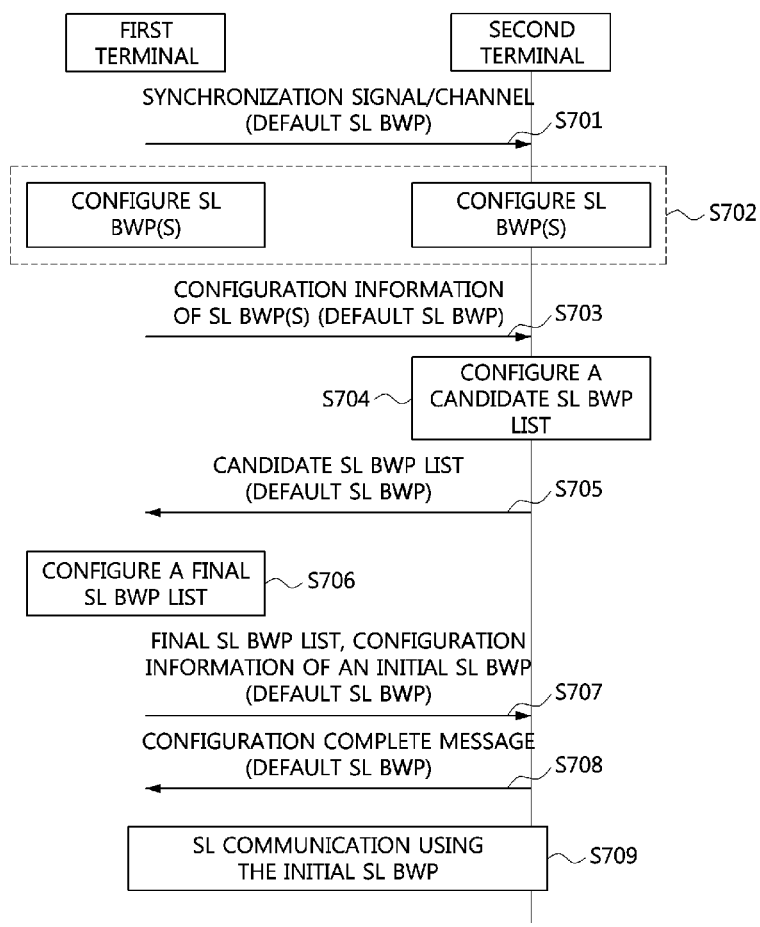
FIG. 7 is a sequence chart illustrating a first exemplary embodiment of a method of configuring BWPs for sidelink communication.

FIG. 7 is a sequence chart illustrating a first exemplary embodiment of a method of configuring BWPs for sidelink communication. As shown in FIG. 7, a communication system may include a first terminal, a second terminal, and the like. The first terminal and/or the second terminal may be disposed within cell coverage of the base station, however, the present disclosure is not limited thereto. For example, the first terminal may be the UE 235 shown in FIG. 1, and the second terminal may be the UE 236 shown in FIG. 1. The first terminal and the second terminal may be configured identically or similarly to the communication node 300 shown in FIG. 3. The first terminal and the second terminal may support the protocol stacks shown in FIGS. 4 to 6.

A default SL BWP used for a configuration procedure (e.g., initial configuration procedure) of SL communication between the first terminal and the second terminal may be configured. In addition, the default SL BWP may be used for transmitting and receiving a small amount of data in the SL communication between the first terminal and the second terminal. The default SL BWP may be used for releasing configuration of the SL communication between the first terminal and the second terminal, releasing configuration of the SL BWP, and the like. The default SL BWP may be configured as follows.

Default SL BWP Configuration Method #1

The default SL BWP may be predefined in the 3GPP technical specification, and the first terminal and the second terminal may use the default SL BWP defined in the 3GPP technical specification. For example, an index, location information, and size information of the default SL BWP may be defined in the 3GPP technical specification. The index of the default SL BWP may be zero. In particular, the SL BWP #0 may refer to the default SL BWP. The location information of the default SL BWP may indicate a starting physical resource block (PRB) of the default SL BWP. The starting PRB of the default SL BWP may be indicated by an offset (e.g., frequency offset) from a preconfigured point (e.g., 'point A' for a common resource block (CRB)). The starting PRB of the default SL BWP may be a PRB having the lowest frequency among the PRBs constituting the default SL BWP.

The size information of the default SL BWP may indicate a bandwidth (e.g., X MHz) of the default SL BWP or the number of the PRBs constituting the default SL BWP. Particularly, X may be 20. Alternatively, X may be less than 20. Alternatively, X may be greater than 20. When the default SL BWP has a relatively large bandwidth, a frequency range searched for in the configuration procedure (e.g., initial configuration procedure) of the SL communication may increase. When the default SL BWP has a relatively small bandwidth, the frequency range searched for in the configuration procedure (e.g., initial configuration procedure) of the SL communication may decrease. The configuration procedure of the SL communication may be performed rapidly, and power consumption of the terminal may also be reduced.

Default SL BWP Configuration Method #2

In an access procedure (e.g., attach procedure) between the terminal (e.g., the first terminal, the second terminal) and the base station, configuration information of the default SL BWP may be transmitted to the terminals (e.g., the first terminal and the second terminal). For example, the base station may be configured to transmit system information including the configuration information of the default SL BWP to the terminals (e.g., the first terminal and the second terminal). The configuration information of the default SL BWP may include the index, location information, and size information of the default SL BWP. The first terminal and the second terminal may be configured to receive the system information from the base station, and obtain the configuration information of the default SL BWP included in the system information.

Default SL BWP Configuration Method #3

The first terminal and the second terminal connected to the base station (e.g., terminal operating in an RRC connected state or an RRC inactive state) may be configured to obtain the configuration information of the default SL BWP from the corresponding base station. For example, the base station may be configured to inform the terminal of the configuration information of the default SL BWP using one or more of RRC signaling, MAC layer signaling, and physical (PHY) layer signaling. When the RRC signaling is used, the configuration information of the default SL BWP may be included in an RRC message (e.g., higher layer message). When the MAC layer signaling is used, the configuration information of the default SL BWP may be included in a MAC control element (CE). When the PHY layer signaling is used, the configuration information of the default SL BWP may be included in downlink control information (DCI).

In addition, one or more candidate SL BWPs as well as the default SL BWP may be preconfigured. One or more candidate SL BWPs may be configured based on the above-described default SL BWP configuration methods #1 to #3. Configuration information of the candidate SL BWPs may include index(es), location information, and size information of the candidate SL BWPs. The bandwidth of the candidate SL BWP may be 20 MHz or more. When the bandwidth of the candidate SL BWP is 40 MHz or more, a plurality of resource block (RB) sets may be configured within the candidate SL BWP. The RB set may be a listen before talk (LBT) subband. An LBT operation may be performed for each LBT subband.

Particularly, the terminals may be configured to identify configuration information of the RB set(s) based on the above-described default SL BWP configuration methods #1 to #3. The configuration information of the RB set(s) may include one or more of the index(es) of the RB set(s), the number of RBs constituting the RB set, the bandwidth of the RB set, information regarding a guard band(s) located between the RB sets, and the number of RB sets configured within the candidate SL BWP.

Meanwhile, terminals (e.g., the first terminal and the second terminal) to perform SL communication may be configured to perform a configuration procedure of the SL communication. The first terminal may be configured to transmit a synchronization signal and/or channel using the default SL BWP (S701). The synchronization signal and/or channel may be a PSSS, an SSSS, a synchronization signal/physical broadcast channel (SS/PBCH) block, or the like. The SS/PBCH block may be an SS/PBCH block (e.g., SL SS/PBCH block) configured for the SL communication. Alternatively, a discovery signal and/or channel including the synchronization signal and/or channel may be transmitted in the step S701.

The second terminal may be configured to receive the synchronization signal and/or channel from the first terminal by performing a monitoring operation in the default SL BWP, and synchronize with the first terminal based on the synchronization signal and/or channel. The second terminal may be configured to transmit information that indicates that synchronization has been acquired between the first terminal and the second terminal to the first terminal using the default SL BWP. The first terminal may be configured to identify that the synchronization has been acquired between the first terminal and the second terminal by receiving the corresponding information from the second terminal.

The first terminal and/or the second terminal may configure SL BWP(s) used for the SL communication (S702). The SL BWP(s) may be configured independently in the first terminal and the second terminal. Alternatively, the step S702 may be performed in one of the first terminal and the second terminal. When the candidate SL BWP(s) is configured, the first terminal and/or the second terminal may be configured to select the SL BWP(s) used for the SL communication among the candidate SL BWP(s).

Alternatively, the first terminal and/or the second terminal may configure the SL BWP(s) regardless of the candidate SL BWP(s). The number of SL BWPs configured by the first terminal and/or the second terminal may be less than or equal to a preconfigured maximum number. The maximum number of configurable SL BWPs may be predefined in the 3GPP technical specification. Alternatively, the base station may be configured to inform the terminals of the maximum number of configurable SL BWPs using at least one of RRC signaling, MAC signaling, and PHY signaling.

The bandwidth of the SL BWP may be less than or equal to the maximum bandwidth available for SL communication. The SL BWP may include consecutive RB(s) in the frequency domain. One SL BWP may have one subcarrier spacing. The SL BWP may be classified into an SL transmission (TX) BWP and an SL reception (RX) BWP. Alternatively, the SL BWP may be configured without discrimination between TX and RX. The SL TX BWP may be an SL BWP used for the transmission operation of the first terminal or the second terminal, and the SL RX BWP may be an SL BWP used for the reception operation of the first terminal or the second terminal. The SL BWPs may be configured as follows.

Figure 8:
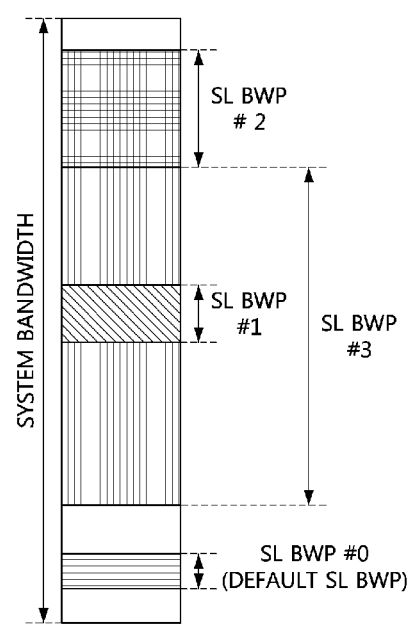
FIG. 8 is a conceptual diagram illustrating a first exemplary embodiment of SL BWPs for sidelink communication.

FIG. 8 is a conceptual diagram illustrating a first exemplary embodiment of SL BWPs for sidelink communication.

For example, each of the first terminal and the second terminal may be configured to transmit first SL data using the initial SL BWP. The initial SL BWP may be one of the SL BWPs #1 to #3. Alternatively, the initial SL BWP may be the default SL BWP (e.g., SL BWP #0).

Referring back to FIG. 7, the first terminal may be configured to transmit configuration information of the SL BWP(s) configured in the step S702 to the second terminal using the default SL BWP (S703). The configuration information of the SL BWP(s) may be transmitted on an SL channel. The step S703 may be performed by the second terminal instead of the first terminal. In particular, the second terminal may be configured to transmit the configuration information of the SL BWP(s) configured by the second terminal to the first terminal using the default SL BWP. Alternatively, both the first terminal and the second terminal may be configured to perform the step S703. The configuration information of each of the SL BWPs may include one or more parameters defined in Table 3 below.

TABLE 3

| | Description |
|---|---|
| index | Index may be used for identifying an SL BWP among the plurality of SL BWPs |
| Location information | Location information of an SL BWP in frequency domain. The location information may indicate a starting PRB of the SL BWP. The starting PRB of the SL BWP may be expressed as a frequency offset to a preconfigured point. Alternatively, the starting PRB of the SL BWP may be expressed as a frequency offset to a starting PRB of another SL BWP (e.g., SL BWP #0). |
| Size information | Size information may indicate the bandwidth of the SL BWP or the number of RBs constituting the SL BWP. |
| Transmission direction information | The transmission direction information may indicate whether the SL BWP is an SL TX BWP or an SL RX BWP. |
| Transmission scheme information | The transmission scheme information may indicate the transmission scheme supported by the SL BWP (e.g., broadcast scheme, multicast scheme, groupcast scheme, unicast scheme). |
| Priority information | The priority information may indicate the priority of the SL BWP among the plurality of SL BWPs |
| Service type information | The service type information may indicate the type of communication system performed in the SL BWP (e.g., eMBB, URLLC, mMTC). |
| LBT type information | The LBT type information may indicate the type of LBT operation performed in the SL BWP (e.g., LBT category 1, 2, 3, 4) |
| Zone information | The zone information may indicate the zone associated with the SL BWP. Each of the SL BWPs may be associated with a different zone. The terminal may perform SL communication by using an SL BWP associated with a specific zone when the terminal is located in the specific zone. |
| RB set information | Configuration information of RB set(s) configured in the SL BWP. The configuration information of RB set(s) may include one or more of indexes, location information, size information, and the number of the RB set(s). |

As shown in FIG. 8, a plurality of SL BWPs may be configured for SL communication. The SL BWPs #0 to #3 may be configured within the system bandwidth. The SL BWP #0 may be a default SL BWP, and the SL BWPs #1 to #3 may be SL BWPs configured by the first terminal and/or the second terminal. The SL BWP(s) configured by the first terminal may be different from the SL BWP(s) configured by the second terminal. The bandwidth of each of the SL BWPs #0 to #3 may be configured independently. The bandwidth of the SL BWP #0 may be less than or equal to the bandwidth of each of the SL BWPs #1 to #3.

One or more SL BWPs among the SL BWPs #1 to #3 may be activated in a specific time interval, and SL data may be transmitted via the active SL BWP. The active SL BWP may be switched as needed. The first SL BWP activated first for the SL communication between the first terminal and the second terminal may be referred to as an 'initial SL BWP'.

The second terminal may be configured to receive the configuration information of the SL BWP(s) from the first terminal by monitoring the default SL BWP, and identify the parameters included in the configuration information of the SL BWP(s) (e.g., parameters described in Table 3). The second terminal may be configured to compare the SL BWP(s) configured by the second terminal and the SL BWP(s) configured by the first terminal. The second terminal may configure an SL BWP list (e.g., candidate SL BWP list) including the SL BWP(s) used for the SL communication between the first terminal and the second terminal (S704). The SL BWP list may be configured based on a result of comparison between the SL BWP(s) configured by the second terminal and the SL BWP(s) configured by the first terminal.

The SL BWP list may include SL TX BWP(s) and SL RX BWP(s). Alternatively, the SL BWP list may include SL BWP(s) used for both transmission (TX) and reception (RX). In other words, the SL BWP list may be configured without discrimination between transmission (TX) and reception (RX). The SL BWP list may include (the SL BWP(s) configured by the first terminal+the SL BWP(s) configured by the second terminal), (common SL BWP(s) among the SL BWP(s) configured by the first terminal and the second terminal), or (SL BWP(s) having priorities equal to or above a preconfigured level among the SL BWPs configured by the first terminal and the second terminal). When the configuration information of the SL BWP(s) configured by the first terminal and the configuration information of the SL BWP(s) configured by the second terminal have already been exchanged between the first terminal and the second terminal, the SL BWP list may include index(es) of the SL BWP(s). The SL BWP list configured in the step S704 may be a candidate SL BWP list.

The second terminal may be configured to transmit the SL BWP list (e.g., candidate SL BWP list) to the first terminal using the default SL BWP (S705). The SL BWP list may be transmitted on an SL channel. When the configuration information of one or more SL BWPs belonging to the SL BWP list has not been exchanged between the first terminal and the second terminal, in the step S705, the second terminal may be configured to transmit, to the first terminal, the SL BWP list and also configuration information (e.g., parameters described in Table 3) of one or more SL BWPs belonging to the SL BWP list. When the step S703 is performed by the second terminal instead of the first terminal, the steps S704 and S705 may be performed by the first terminal.

Further, the first terminal may be configured to receive the SL BWP list from the second terminal by monitoring the default SL BWP. In addition, the second terminal may be configured to receive the SL BWP list and also the configuration information of one or more SL BWPs belonging to the SL BWP list from the second terminal. Based on one or more of the SL BWP(s) configured by the first terminal, the SL BWP list received from the second terminal, and the SL BWP(s) configured by the second terminal, the first terminal may configure an SL BWP list (e.g., final SL BWP list) including SL BWP(s) to be used for the first terminal and the second terminal (S706). The SL BWP list configured in the step S706 may be a final SL BWP list including the SL BWP(s) to be actually used for SL communication. The final SL BWP list may include index(es) of the SL BWP(s). In addition, the final SL BWP list may further include the configuration information of the SL BWP(s) (e.g., parameters described in Table 3).

The first terminal may additionally be configured to determine one SL BWP among the SL BWP(s) belonging to the final SL BWP list as the initial SL BWP. For example, the SL BWP #1 shown in FIG. 8 may be configured as the initial SL BWP. Alternatively, the default SL BWP may be configured as the initial SL BWP. The initial SL BWP may be the SL BWP used first in the SL communication between the first terminal and the second terminal among the SL BWP(s) belonging to the final SL BWP list. The first terminal may be configured to transmit the final SL BWP list and the configuration information of the initial SL BWP to the second terminal using the default SL BWP (S707). The configuration information of the initial SL BWP may include the index of the initial SL BWP and information on a time interval (i.e., valid time interval) in which the initial SL BWP is valid. The information regarding the time interval may include at least one of a starting time, a length (e.g., duration), and an ending time of the initial SL BWP. In addition, the configuration information of the initial SL BWP may include one or more parameters defined in Table 3.

The second terminal may be configured to receive the final SL BWP list and the configuration information of the initial SL BWP from the first terminal by monitoring the default SL BWP. The second terminal may be configured to identify the SL BWP(s) included in the final SL BWP list, and configure the initial SL BWP. In addition, the second terminal may be configured to identify the valid time interval in which the initial SL BWP is valid. When the configuration for the SL communication is completed, the second terminal may be configured to transmit a configuration complete message indicating that the configuration of the SL communication is completed to the first terminal using the default SL BWP (S708). The configuration complete message may be transmitted on an SL channel.

The first terminal may be configured to receive the configuration complete message from the second terminal by monitoring the default SL BWP. In particular, the first terminal may be configured to determine that the configuration of the SL communication is completed in the second terminal. The first terminal and the second terminal may be configured to perform SL communication using the initial SL BWP (S709). The SL communication between the first terminal and the second terminal may be performed in a broadcast scheme, a multicast scheme, a groupcast scheme, or a unicast scheme. The SL communication may be performed according to a transmission scheme supported by the initial SL BWP. The SL communication in the initial SL BWP may be performed within the valid time interval. When the valid time interval expires, the active SL BWP may be switched from the initial SL BWP to the default SL BWP. Therefore, the first terminal and the second terminal may be configured to operate in the default SL BWP. Alternatively, even when the valid time interval expires, the first terminal and the second terminal may be configured to operate in the initial SL BWP.

Meanwhile, switching of the SL BWP used for the SL communication between the first terminal and the second terminal may be required. A switching procedure of the SL BWP may be performed as follows.

Figure 9:
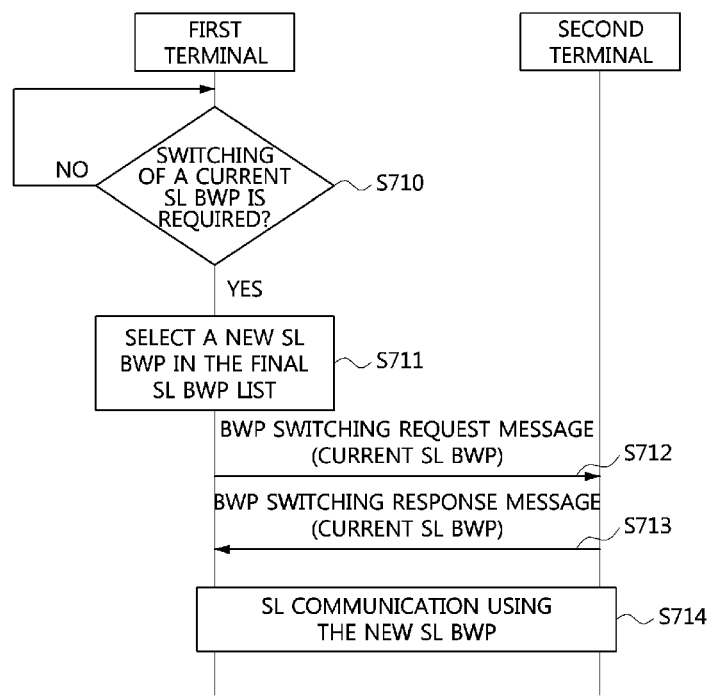
FIG. 9 is a sequence chart illustrating a first exemplary embodiment of a switching method of a BWP for sidelink communication.

FIG. 9 is a sequence chart illustrating a first exemplary embodiment of a switching method of BWPs for sidelink communication. As shown in FIG. 9, the first terminal shown in FIG. 9 may be the first terminal shown in FIG. 7, and the second terminal shown in FIG. 9 may be the second terminal shown in FIG. 7. The steps shown in FIG. 9 may be performed after step S709 shown in FIG. 7. While SL communication is performed between the first terminal and the second terminal, the first terminal may be configured to determine whether to perform a switching operation of the SL BWP (e.g., active SL BWP) used for the SL communication (S710). Alternatively, the step S710 may be performed by the second terminal instead of the first terminal. In other words, the step S710 may be performed by one or more terminals among terminals participating in the SL communication. For example, the first terminal may be configured to initiate the switching operation of the SL BWP when one or more of the following conditions are satisfied.

Condition #1: the valid time interval of the current SL BWP expires.

Condition #2: a transmission scheme (e.g., groupcast scheme) different from a transmission scheme (e.g., unicast scheme) currently supported by the SL BWP is required to be used.

Condition #3: when an SL communication quality in the current SL BWP is less than or equal to a preconfigured reference (e.g., received signal quality, number of acknowledgments (ACKs) or negative ACKs (NACKs), a ratio of ACKs and NACKs).

Condition #4: when an SL BWP having a bandwidth greater than that of the current SL BWP is required to be used based on SL communication characteristics (e.g., transmission speed, size of SL data, transmission reliability, transmission delay, resource occupancy status, frequency regulation).

Condition #5: when an SL BWP having a bandwidth narrower than that of the current SL BWP is required to be used based on SL communication characteristics (e.g., transmission speed, size of SL data, transmission reliability, transmission delay, resource occupancy status, frequency regulation).

Condition #6: when a zone to which the first terminal and/or the second terminal belongs differs from a zone associated with the current SL BWP due to mobility.

In response to determining that the switching of the current SL BWP is unnecessary, the first terminal and the second terminal may be configured to perform the SL communication using the current SL BWP. However, in response to determining that the switching of the current SL BWP is necessary, the switching procedure of the SL BWP may be performed. For example, the first terminal may be configured to select a new SL BWP in the final SL BWP list (e.g., the final SL BWP list configured in the step S706 shown in FIG. 7) (S711). Alternatively, another SL BWP that does not belong to the final SL BWP list may be configured as a new SL BWP. The new SL BWP may be selected based on an SL communication quality, a transmission scheme, SL communication characteristics (e.g., transmission speed, size of SL data, transmission reliability, transmission delay, resource occupancy status, frequency regulation), a zone, and the like.

The first terminal may be configured to generate a BWP switching request message including configuration information of the new SL BWP. The configuration information of the new SL BWP may include an index of the new SL BWP and information on a valid time interval of the new SL BWP. The information on the valid time interval may include one or more of a starting time, a length (e.g., duration), and an ending time of the new SL BWP. When the new SL BWP does not belong to the final SL BWP list, the configuration information of the new SL BWP may include one or more parameters described in Table 3. The first terminal may be configured to transmit the BWP switching request message to the second terminal using the current SL BWP (e.g., initial SL BWP) (S712). When the current SL BWP is terminated, the first terminal may be configured to transmit the BWP switching request message to the second terminal using the default SL BWP. Alternatively, even when the current SL BWP is terminated, the first terminal may be configured to operate in the current SL BWP. Therefore, the first terminal may be configured to transmit the BWP switching request message using the current SL BWP. The BWP switching request message may be transmitted on an SL channel.

Further, the second terminal may be configured to receive the BWP switching request message from the first terminal using the current SL BWP or the default SL BWP. When the BWP switching request message is received from the first terminal, the second terminal may be configured to determine that the switching of the SL BWP is requested. When the current SL BWP is not terminated, the BWP switching request message may be received via the current SL BWP. When the current SL BWP is terminated, the BWP switching request message may be received via the default SL BWP. Alternatively, even when the current SL BWP is terminated, the second terminal may be configured to operate in the current SL BWP. In particular, the BWP switching request message may be received via the current SL BWP.

The second terminal may be configured to identify the configuration information of the new SL BWP included in the BWP switching request message, and may configure the new SL BWP based on the configuration information. The second terminal may be configured to transmit a BWP switching response message indicating that the configuration of the new SL BWP is completed to the first terminal using the current SL BWP (S713). When the current SL BWP is terminated, the second terminal may be configured to transmit the BWP switching response message to the first terminal using the default SL BWP. Alternatively, even when the current SL BWP is terminated, the second terminal may be configured to operate in the current SL BWP. In particular, the BWP switching response message may be transmitted via the current SL BWP. The BWP switching response message may be transmitted on an SL channel. When the step S710 is performed by the second terminal, the steps S711 and S712 may be performed by the second terminal, and the step S713 may be performed by the first terminal.

The first terminal may be configured to receive the BWP switching response message from the second terminal using the current SL BWP or the default SL BWP. When the current SL BWP is not terminated, the BWP switching response message may be received via the current SL BWP. When the current SL BWP is terminated, the BWP switching response message may be received via the default SL BWP. Alternatively, even when the current SL BWP is terminated, the first terminal may be configured to operate in the current SL BWP. In particular, the BWP switching response message may be received via the current SL BWP.

When the BWP switching response message is received from the second terminal, the first terminal may be configured to determine that configuration of the new SL BWP is completed in the second terminal. Therefore, the first terminal and the second terminal may be configured to perform the SL communication using the new SL BWP (S714). The SL communication between the first terminal and the second terminal may be performed in a broadcast scheme, a multicast scheme, a groupcast scheme, or a unicast scheme. The SL communication may be performed according to a transmission scheme supported by the new SL BWP. The SL communication in the new SL BWP may be performed within the valid time interval of the new SL BWP.

When the valid time interval expires or a timer expires (e.g., preset time elapses), the active SL BWP may be configured to switch from the new SL BWP to the previous SL BWP, the initial SL BWP, the default SL BWP, or another SL BWP. In particular, the first terminal and the second terminal may be configured to perform the SL communication in the switched SL BWP. The timer may be configured in advance between the first terminal and the second terminal. For example, the timer may be exchanged between the first terminal and the second terminal through the step S712 and/or the step S713.

Meanwhile, according to the above exemplary embodiments, the SL BWP may be switched as follows.

Figure 10:
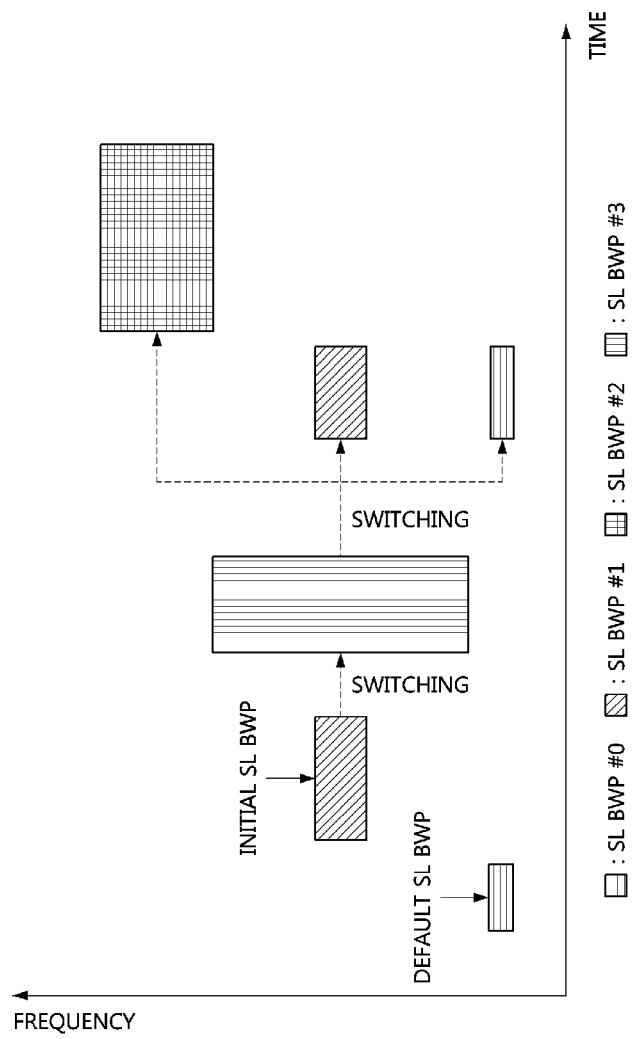
FIG. 10 is a sequence chart illustrating a second exemplary embodiment of a switching method of BWPs for sidelink communication.

FIG. 10 is a sequence chart illustrating a second exemplary embodiment of a switching method of BWPs for sidelink communication. As shown in FIG. 10, the SL BWP #0 may be configured as the default SL BWP for SL communication between the first terminal (e.g., the first terminal shown in FIGS. 7 and 9) and the second terminal (e.g., the second terminal shown in FIGS. 7 and 9). The first terminal and the second terminal operating in the default SL BWP may be configured to perform the steps S701 to S708 shown in FIG. 7. For example, the final SL BWL list configured in the step S706 shown in FIG. 7 may include the SL BWPs #1 to #3, and the SL BWP #1 may be configured as the initial SL BWP. The first terminal and the second terminal may be configured to perform SL communication using the initial SL BWP.

Meanwhile, it may be determined that switching of the SL BWP is necessary in the first terminal and/or the second terminal. In the step S710 shown in FIG. 9, a controller may be configured to determine whether the SL BWP is switched, and a new SL BWP may be selected in the step S711 shown in FIG. 9. For example, the controller may be configured to determine to switch the active SL BWP from the initial SL BWP (e.g., SL BWP #1) to the SL BWP #3. Configuration information of the new SL BWP (i.e., SL BWP #3) may be transferred through the step S712 shown in FIG. 9. When the step S713 shown in FIG. 9 is completed, the active SL BWP of the first terminal and the second terminal may be switched from the initial SL BWP to the SL BWP #3. Accordingly, the first terminal and the second terminal may be configured to perform SL communication using the SL BWP #3.

When the SL communication is completed in the SL BWP #3, the active SL BWP of the first terminal and the second terminal may be switched from the SL BWP #3 to the default SL BWP or the initial SL BWP. Alternatively, when the new SL BWP is determined as the SL BWP #2 in the first terminal and/or the second terminal, the active SL BWP of the first terminal and the second terminal may be switched from the SL BWP #3 to the SL BWP #2. Particularly, the first terminal and the second terminal may be configured to perform SL communication using the SL BWP #2.

The exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a first terminal in a communication system, comprising:
   configuring, by a processor, a plurality of sidelink (SL) bandwidth parts (BWPs) used for SL communication between the first terminal and a second terminal;
   transmitting, by the processor, configuration information of the plurality of SL BWPs to the second terminal via a default BWP;
   transmitting, by the processor, an SL BWP list including one or more SL BWPs among the plurality of SL BWPs to the second terminal via the default SL BWP; and
   performing, by the processor, SL communication with the second terminal using an initial SL BWP among the one or more SL BWPs included in the SL BWP list,
   wherein the configuration information includes at least one of the information regarding a location, a size, a valid time interval of each of the plurality of SL BWPs, and combinations thereof.

2. The operation method according to claim 1, wherein the one or more SL BWPs included in the SL BWP list are selected from a plurality of SL BWPs configured by the first terminal and the plurality of SL BWPs configured by the second terminal.

3. The operation method according to claim 1, wherein the default SL BWP is configured by a base station through a combination of one or more of radio resource control (RRC) signaling, medium access control (MAC) layer signaling, and physical (PHY) layer signaling.

4. The operation method according to claim 1, wherein the initial SL BWP is determined by the first terminal, and configuration information of the initial SL BWP is transmitted to the second terminal together with the SL BWP list.

5. The operation method according to claim 1, wherein the plurality of SL BWPs belong to candidate SL BWPs configured by a base station.

6. The operation method according to claim 1, wherein the SL communication is performed within a valid time interval in which the initial SL BWP is valid.

7. The operation method according to claim 1, further comprising:
   when characteristics of the SL communication between the first terminal and the second terminal satisfy one or more conditions, determining, by the processor, that switching of the initial SL BWP is necessary;
   selecting, by the processor, a new SL BWP in the SL BWP list;
   transmitting, by the processor, a switching request message including configuration information of the new SL BWP to the second terminal; and
   performing, by the processor, the SL communication with the second terminal using the new SL BWP.

8. The operation method according to claim 7, wherein the one or more conditions include: a valid time interval of the initial SL BWP expiring, a use of a transmission scheme different from a transmission scheme supported by the initial SL BWP is required, a quality of the SL communication in the initial SL BWP is less than or equal to a preconfigured threshold, a use of a SL BWP having a bandwidth different from a bandwidth of the initial SL BWP is required, and a zone to which at least one of the first terminal and the second terminal belongs is different from a zone associated with the initial SL BWP.

9. The operation method according to claim 7, wherein when the SL communication is completed in the new SL BWP, the new SL BWP is switched to the default SL BWP or the initial SL BWP.

10. An operation method of a second terminal in a communication system, comprising:
    receiving, at a processor from a first terminal, configuration information of a plurality of sidelink (SL) bandwidth parts (BWPs) configured by the first terminal through a default SL BWP;

configuring, by the processor, a candidate SL BWP list including one or more SL BWPs based on a plurality of SL BWPs configured by the second terminal and the plurality of SL BWPs configured by the first terminal;

transmitting, by the processor, the candidate SL BWP list to the first terminal via the default SL BWP;

receiving, by the processor, a final SL BWP list determined based on the candidate SL BWP list and configuration information of an initial SL BWP from the first terminal via the default SL BWP; and performing, by the processor, SL communication with the first terminal using the initial SL BWP.

11. The operation method according to claim 10, wherein the configuration information of the plurality of SL BWPs includes one or more of information regarding a location, a size, and a valid time interval of each of the plurality of SL BWPs.

12. The operation method according to claim 10, wherein the default SL BWP is configured by a base station through a combination of one or more of radio resource control (RRC) signaling, medium access control (MAC) layer signaling, and physical (PHY) layer signaling.

13. The operation method according to claim 10, further comprising:

when characteristics of the SL communication between the first terminal and the second terminal satisfy one or more conditions, determining, by the processor, that switching of the initial SL BWP is necessary;

selecting, by the processor, a new SL BWP in the SL BWP list;

transmitting, by the processor, a switching request message including configuration information of the new SL BWP to the first terminal; and performing, by the processor, the SL communication with the first terminal using the new SL BWP.

14. The operation method according to claim 13, wherein when the SL communication is completed in the new SL BWP, the new SL BWP is switched to the default SL BWP or the initial SL BWP.

15. A first terminal in a communication system, the first terminal including a processor and a memory configured to store at least one instruction executable by the processor, wherein the at least one instruction causes the processor to:

configure a plurality of sidelink (SL) bandwidth parts (BWPs) used for SL communication between the first terminal and a second terminal;

receive a candidate SL BWP list including at least one SL BWP configured by the second terminal from the second terminal via a default SL BWP;

transmit a final SL BWP list including one or more SL BWPs among the plurality of SL BWPs and the at least one SL BWP included in the candidate SL BWP list to the second terminal through the default SL BWP; and perform SL communication with the second terminal using an initial SL BWP among the one or more SL BWPs included in the final SL BWP list.

16. The first terminal according to claim 15, wherein configuration information of the plurality of SL BWPs is exchanged between the first terminal and the second terminal via the default SL BWP, and the configuration information includes one or more of information regarding a location, a size, and a valid time interval of each of the plurality of SL BWPs.

17. The first terminal according to claim 15, wherein the initial SL BWP is determined by the first terminal, and configuration information of the initial SL BWP is transmitted to the second terminal together with the final SL BWP list.

18. The first terminal according to claim 15, wherein the at least one instruction further causes the processor to:

receive a switching request message from the second terminal, the switching request message including configuration information of a new SL BWP selected in the final SL BWP list;

transmit a switching response message to the second terminal, the switching response message indicating completion of configuration of the new SL BWP; and perform the SL communication with the second terminal using the new SL BWP.

19. The first terminal according to claim 15, wherein when the SL communication is completed in a new SL BWP, the new SL BWP is switched to the default SL BWP or the initial SL BWP.

20. An operation method of a first terminal in a communication system, comprising:

configuring, by a processor, a plurality of sidelink (SL) bandwidth parts (BWPs) used for SL communication between the first terminal and a second terminal;

transmitting, by the processor, an SL BWP list including one or more SL BWPs among the plurality of SL BWPs to the second terminal via a default SL BWP; and performing, by the processor, SL communication with the second terminal using an initial SL BWP among the one or more SL BWPs included in the SL BWP list, wherein the initial SL BWP is determined by the first terminal, and configuration information of the initial SL BWP is transmitted to the second terminal together with the SL BWP list.

* * * * *